MANUFACTURE OF STEREOPHONIC PHONOGRAPH RECORDS

Filed Dec. 18, 1952

INVENTOR
Daniel P. Doncaster
BY
Pennie, Edmonds, Morton, Barrows and Taylor
ATTORNEYS

1

2,772,888

MANUFACTURE OF STEREOPHONIC PHONOGRAPH RECORDS

Daniel P. Doncaster, Long Island City, N. Y., assignor to Columbia Broadcasting System, Inc., New York, N. Y., a corporation of New York Application December 18, 1952, Serial No. 326,706

11 Claims. (Cl. 274—46)

This invention relates to phonograph records and to a method of manufacture thereof and more particularly to the manufacture of flat disk phonograph records bearing stereophonically related recordings of the same sounds on their opposite faces. The invention provides a method of manufacturing such phonograph records by which correct relative circumferential positioning of the recordings on the opposite faces of the records in a predetermined relation is insured so that with appropriate relative positioning of the play back heads or transducers in a reproducing phonograph apparatus the sounds reproduced from such records by play back styli engaging the two faces of the record simultaneously will be stereophonically related as were the sounds perceived at separate pick-up points of which the recordings on the two faces of the record are separately representative.

Phonograph records of the type referred to in the preceding paragraph are disclosed and claimed in the copending application of Peter C. Goldmark, Serial No. 276,648, filed March 14, 1952, and assigned to the assignee hereof. In the phonograph records of the said copending application, separate sound grooves are provided on the two sides of the disk record, pressed from separate master records cut at exactly the same angular speed so that in the sound grooves on opposite sides of those records at every angular distance from starting points at predetermined bearings about the record disk axis the undulations are representative of sounds simultaneously perceived at spaced locations upon pickup. Preferably the reference bearings are the same on both sides of the record disk, and the sound grooves are cut with the same pitch and initial radius so that stereophonically related undulations on the two faces of the disk are positioned everywhere at the same locations circumferentially of the disk and, morever, at the same locations radially thereof except, in the case of laterally cut records, for the stereophonic differences in amplitude and phase which are intended to be preserved. Apart from the modulation thereof therefore the two sound grooves constitute congruent spirals defined by the intersections with the faces of the disk of a cylindrical surface having one of the sound grooves as spiral directrix and having elements perpendicular to those faces. The records of this preferred form of stereophonic phonograph record are therefore to be played back with reproducing apparatus whose pick-up styli are disposed "tip-to-tip." Otherwise stated, the stereophonically related undulations in the two faces of the record are located in single planes containing the axis of the record disk and at the same radial distance from that axis except, in the case of laterally cut sound grooves, for the variations in phase and amplitude which represent the stereophonic differences between the two recordings. Stereophonically related undulations are moreover located at equal angular and linear distances from groove strating points which lie at the intersections with the faces of the record of a line perpendicular to those faces and passing through the sound grooves.

2

For the successful use of the records disclosed in the said application, whether of the preferred type above referred to or not, it is essential that a known relative circumferential positioning of the two recordings be established with a high degree of accuracy. Unless the two recordings are so positioned, the play back heads of a reproducing phonograph will not engage the two recordings at stereophonically related undulations, and the stereophonic reproduction will be lost.

In the said copending application it is suggested that correct relative circumferential positioning of the recordings on the two faces of the record may be achieved by the use of indexing notches on the master records on which the two recordings are cut. These notches provide a visual or tangible index according to which the matrices or stampers from which the finished stereophonic records are pressed may be properly oriented with respect to each other in the record press. For example, the blank master records may be positioned on the cutting turntables with these notches at equal angles from the bearings of the lead screws which carry the cutting heads, so that with the turntables moving at equal angular speeds stereophonically related undulations will be located at equal angular and linear distances from the bearings identified by the notches in the master records. If the notches are retained throughout the successive positive and negative plates which intervene between the master record disks and the negative matrices, the matrices may be assembled in the record press with the notches opposite each other to press records in which stereophonically related undulations will lie in planes containing the record axis. Such records may then be played back by means of pick-up heads whose styli are tip-to-tip.

The present invention provides another and, it is believed, a more accurate method of establishing a correct relative circumferential positioning of the two recordings on the opposite faces of such stereophonic records. According to the present invention there are recorded on the two master record disks phasing grooves representative, preferably, of pure tones or of other signals such as sharply initiated and terminated pulses of pure tones. These phasing grooves, which may be closed grooves of a single turn or which may be spiral grooves separate from or continuous with the grooves containing the material to be reproduced stereophonically, are cut either before or after the cutting of the stereophonic spiral grooves without other than equal angular motions of the two turntables between the cuting of the phasing grooves and the cutting of the stereophonic spiral grooves. The phasing grooves are moreover cut with a known phase relation in time of the phasing signals applied at the cutting styli. In a typical example, the phasing signal consists of a series of pulses of a pure tone recorded on both master records at the same phase or with a phase difference of 180°.

The master records including the phasing grooves and the stereophonic spiral grooves are then positioned back to back on a suitable turntable from which they can be played back by means of pick-up heads having the same circumferential relationship as are to have the pick-up heads of the phonograph apparatus with which the records are to be reproduced. The two master record disks are then adjusted circumferentially with respect to each other until the phasing signals as picked up by the reproducing styli exhibit the same phase relationship in time as did the phasing signals applied to the cutting heads. With the master records clamped together in this adjusted position a mechanical index mark is impressed on each as by means of a punch passed through both perpendicular to their faces. The punch marks thus produced, as preserved in the intermediate negative and positive plates, may be employed in the matrices to orient them correctly in the final record press. Preferably a phasing signal is employed having a total period long compared to the lowest frequency in the recorded sound of the stereophonic spiral sound grooves so as to preclude mis-positioning of the master records by an integral number of cycles of the phasing signal. Thus for example the phasing signal may advantageously consist of a pure tone of a frequency of the order of the highest frequency for which stereophonic phasing is important, modulated in a pattern of dots and dashes having a total period equal to the time in which the turntables rotate through several degrees.

By means of a coarse adjustment the two master records are brought into a relation differing from the desired relation by not more than one cycle of the high frequency (pure tone) component of the phasing signal, so that the operator can tell which cycle of the high frequency component of the phasing signal in one master record it is desired to associate with which cycle of the high frequency component of the phasing signal in the other master record. A fine adjustment is then made in the relative position of the two master records to establish a desired phase relation of the two high frequency signals before the master records are mechanically indexed.

The invention will now be described in further detail with reference to the accompanying drawings in which.

Figure 2:
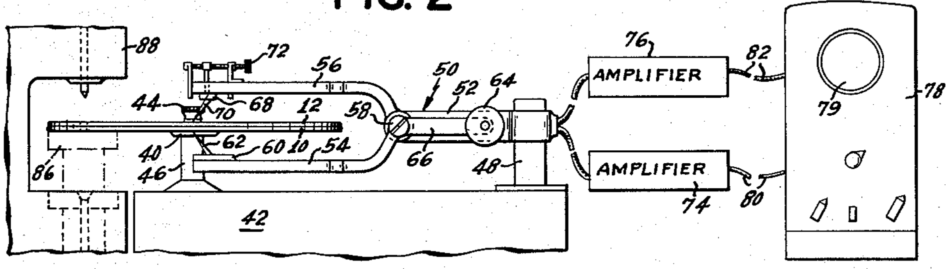
Fig. 2 is a diagrammatic view of a play back apparatus permitting simultaneous engagement of the phasing grooves of the two master records of Fig. 1, together with certain auxiliary equipment useful in establishing appropriately located index marks on the master records, in accordance with the invention.
Figures 5, 6:
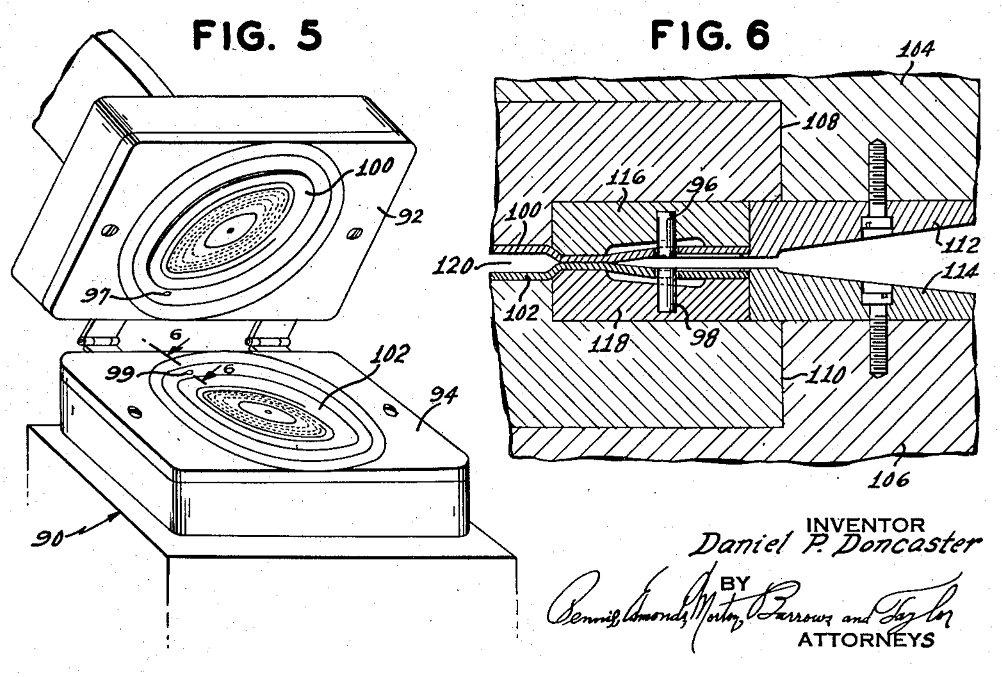

Fig. 5 is a perspective view of a record press for the manufacture of two-sided stereophonic phonograph records, the press platens being opened to show a preferred relative circumferential positioning of the matrices by means of index marks derived from the index marks established on the master records from which the matrices are made, by the apparatus of Fig. 2; and Fig. 6 is a partial sectional view through the press of Fig. 5 when closed taken along the line 6—6 of Fig. 5.

Figure 1:
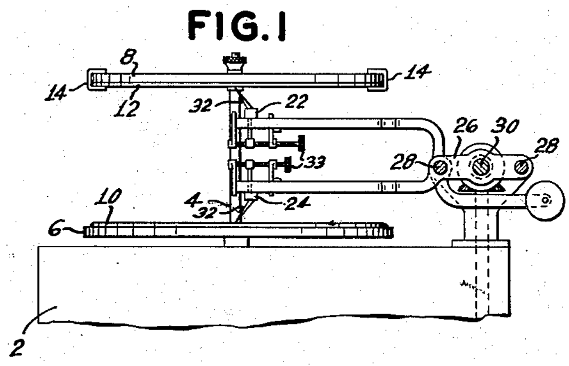
Fig. 1 is a view in side elevation of one form of duplicate recording lathe suitable for cutting stereophonically related master records.

In Fig. 1 a record lathe generally indicated at 2 includes a spindle 4 to which are affixed two turntables 6 and 8, the upper being removable. According to the method of the invention for the manufacture of stereophonic phonograph records, a blank master record 10 is supported on the upper side of the turntable 6, and a blank master record 12 is supported against the underside of the turntable 8 by suitable means such as clips 14 overlying the edge of the record. Separate electromechanical transducers or cutting heads 22 and 24 are supported from a carriage 26 which moves on parallel rails 28 under the influence of a lead screw 30. The cutting heads 22 and 24 are dimensioned to position the ends of their styli 32 substantially on a line parallel to the axis of rotation of the turntables, this line and the axis of rotation of the turntables defining a plane to which the lead screw 30 is parallel. If desired screw adjustments 33 may be provided on the cutting heads to insure positioning of the cutting styli according to this relation.

For the cutting of the two stereophonically related recordings of the same sounds in spiral sound grooves, the cutting heads 22 and 24 are fed separately with the two stereophonic versions of the sounds to be recorded. The signals applied to the cutting heads 22 and 24 may be derived from spaced microphones exposed to the sounds to be recorded, suitable precautions being taken to provide equality in the phase change and amplitude transfer characteristics over the acoustical and electrical channels between the microphones and the cutting heads. Alternatively the cutting heads may be energized with signals derived from stereophonically related recordings in parallel tracks on a magnetic tape.

Either before or after the cutting of the spiral sound grooves containing the stereophonically related recordings, and with precautions taken against relative movement of the two master records, there is cut into each of the master records 10 and 12 a supplementary groove, which may be called a phasing groove, containing a signal of identical form in both records. This signal contains a strong component at a frequency in the middle audio range, in order to permit relative circumferential positioning of the two master records to a tolerance of a fraction of a cycle of this frequency.

Figure 3:
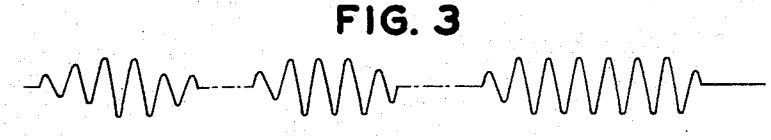
Fig. 3 is a diagram illustrating the wave form of a signal suitable for use as a phasing signal in the master records of Fig. 1.

One form of phasing signal is shown in Fig. 3. It consists of a substantially pure tone of a frequency in the middle audio range, modulated in a pattern of dots and dashes. A frequency of 500 or 100° C. P. S. may be employed for the pure tone modulation, for example. The frequency of the pure tone modulation may be selected of the same order of magnitude as the highest frequency for which it is important to preserve the differences in phase which characterize the stereophonically related sounds as perceived at the spaced points of pick-up on recording.

The phasing grooves may be either closed grooves of a single turn or spiral grooves separate from or continuous with the sound grooves containing the intelligence to be stored in stereophonically related versions on the two-sided records to be manufactured, and they may be located either radially inside or radially outside of the spiral sound grooves and of the lead-in and lead-out spiral grooves of relatively large pitch which in accordance with standard practice are cut to connect with the sound grooves.

In cutting the phasing grooves, the phasing signal is applied to both cutting heads 22 and 24 in the same phase in time, or in opposite or in some other and preferably simple known relative phase in time. The same phasing signal is applied to the cutting heads 22 and 24 from any convenient source, and it is caused to arrive at the two cutting heads in known relative time phase as to its pure tone component. A phase difference of 180° may be obtained for example by inserting a suitable delay element immediately ahead of one of the cutting heads or by reversing the leads thereto with respect to the position which they occupy during recording of the sound grooves.

It is important that, except as to a possible desired difference in phase of a fraction of a cycle of the pure tone component, the phasing signals applied to the two cutting heads be of the same form, so that it will be possible to associate not only each dot or pulse of modulation in one phasing groove with the corresponding pulse of modulation in the other but also each cycle of the pure tone modulation in one phasing groove with the corresponding cycle in the other.

After completion of the cutting process on the lathe of Fig. 1 the master records 10 and 12 are assembled with their blank faces together on the turntable of an apparatus adapted to permit simultaneous engagement of the phasing grooves of both master records by reproducing styli having a known relative position tangentially of the phasing grooves and preferably the same relative position as the play back styli in the phonograph apparatus on which the two-sided records to be manufactured will be used. One form of play back apparatus suitable to the practice of the invention for the manufacture of such two-sided phonograph records is shown in Fig. 2.

In Fig. 2 a turntable 40 of smaller diameter than the diameter of the phasing grooves in the master records is mounted in a chassis 42 and supports the two master records so that their phasing grooves can be played back simultaneously. The two records may be fixed against relative motion by means of a nut 44 fitting over the end of the spindle 46 to which the turntable is affixed. A vertical post 48 supported like the spindle 46 of the turntable from the chassis 42 carries a compound tone arm generally indicated at 50. The arm 50 includes a horizontal portion 52 pivoted for rotation on the post 48 and separate tone arms 54 and 56 journaled for rotation about a horizontal axis at 58. The tone arm 54 includes a play back transducer head 60 from which projects a stylus 62 for engagement with the master record supported face down on the turntable. Appropriate contact between the stylus 62 and this master record is insured by means of a counterweight 64 attached to a lever 66 rigid with the tone arm 54. The upper tone arm 56 includes a similar transducer 68 having a stylus 70. The transducer 68 is movably mounted in the tone arm 56 for limited motion radially of the post 48 under control of an adjusting screw 72 so that the styli 62 and 70 may be adjusted to a "tip-to-tip" relation in which their ends lie on a line parallel to the axis of rotation of the turntable. The records 10 and 12 are assembled on the turntable 40 in approximately correct circumferential position for example by matching the lead-in grooves. The styli 62 and 70, adjusted to a "tip-to-tip" relation, are then engaged in the phasing grooves, and the signals developed in the play back heads 60 and 68 by the modulation of the phasing grooves are then applied to suitable apparatus whereby the phase thereof can be compared. One form of apparatus suitable to this purpose is shown in Fig. 2. Separate amplifiers 74 and 76 matched as to phase transfer characteristics receive the signals developed in the pick-up heads 60 and 68 and apply them to a cathode-ray oscillograph 78 whose cathode-ray tube 79 is provided with two electron beams with separate vertical but common horizontal deflection systems. The output of the amplifier 74 is applied to one vertical deflection system via a cable 80, and the output of the amplifier 76 is applied to the other vertical deflection system via a cable 82. The cables 80 and 82 together with those leading from the pick-up heads 62 and 68 to amplifiers 74 and 76 are matched in length as transmission lines.

Figure 4:
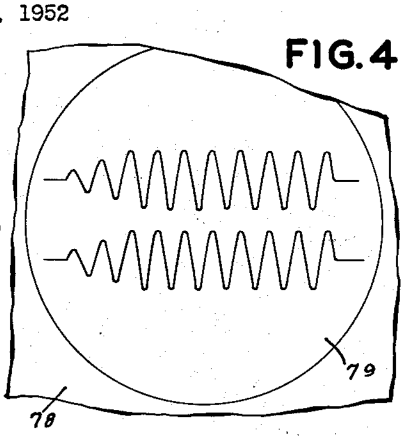
Fig. 4 is a fragmentary enlarged view of the cathode-ray oscillograph of Fig. 2 illustrating the appearance thereof upon proper adjustment of the master records on the turntable of Fig. 2 for an in-phase relation of the phasing signals as applied to the master records.

The horizontal deflection circuit of the oscillograph may be triggered by any selected discontinunity in the phasing signals, for example by the beginning of a pulse of the pure tone modulation in the singal of Fig. 3. A low speed horizontal sweep is first used in order to display a substantial portion of the signals developed at the heads 62 and 68. The oscillograph should preferably be provided with a cathode-ray tube having a long persistence screen. The records 10 and 12 on the turntable 40 are then adjusted circumferentially with respect to each other until the phasing signal appears in approximately the same phase on both traces of the oscillograph. By shifting to a high speed sweep, observation may then be made of differences in phase amounting to fractions of the pure tone component of the phasing signal. Fig. 4 illustrates fragmentarily the appearance of the cathode-ray tube 79 in the oscillograph 78 when correct adjustment of the records 10 and 12 has been reached, assuming an in-phase relation in time of the phasing signals as applied to the cutting heads 22 and 24 of Fig. 1.

When correct relative circumferential positioning of the records has been achieved in accordance with the time phasing of the sinusoidal component of the phasing signals reproduced from the phasing grooves of the master records, a retractable table 86 may be applied to the underside of the lower record, and a hole is bored through both records by means of a drill press 88 provided for the purpose. The hole so bored should be parallel to the axis of rotation of the records on the turntable 40.

According to the invention the holes formed in the positive master records 10 and 12 by the drill press 88 of Fig. 2 are reproduced without circumferential displacement relative to the sound grooves of the master records in the negative plates formed by electrolysis from the master records and again in the subsequent negative plates or matrices employed to press the two-sided stereophonic records under manufacture. Such matrices are shown at 100 and 102, with indexing holes 97 and 99, in Fig. 5. The holes so reproduced in the matrices are then employed according to the invention to position the matrices in the record press.

A record press suitable to the practice of the invention is shown in Fig. 5. The press, generally indicated at 90, is provided with upper and lower platens 92 and 94. Dowels 96 and 98 are affixed in the platens at exactly the same circumferential positions with respect to the cavities into which the matrices 100 and 102 are to fit. With matrices manufactured according to the process of the invention as above described, i. e. with matrices whose indexing holes have the same positions relative to the sound grooves thereon, engagement of the matrices in the press of Fig. 5 positions them so that the two-sided records pressed therefrom will give stereophonic reproduction when their two sound grooves are simultaneously played back by means of pick-up heads whose styli have their ends lying in a line parallel to the axis of rotation of the turntable in the reproducing phonograph apparatus.

The construction of the press of Fig. 5 is shown in greater detail in Fig. 6. To the platens 92 and 94 there are respectively affixed die frames 104 and 106. In these die frames die inserts 108 and 110 support the matrices 100 and 102 during the pressing operation. The matrices are held in the die inserts by clamping rings 112 and 114 and by coining rings 116 and 118 into which the dowels 96 and 98 are fitted. The coining rings can be adjusted circumferentially to each other to bring the dowels 96 and 98 into exact register and locked by keying means not shown. It may be observed that the dowels lie radially outside the cavity at 120 between the matrices.

The phasing signal employed in the practice of the invention may of course differ very materially from that shown in Fig. 3 of the drawings. It may consist of a sine wave having a frequency in the audio range maintained for any duration from a few cycles up, provided only that if the phasing grooves are closed, some discontinuity is provided in the groove so that ambiguity may be avoided in associating the cycles of the audio component of the phasing signal as recorded in one master record with the corresponding cycles as recorded in the phasing signal of the other master record. A sufficient discontinuity may be provided at the points where the phasing grooves, if closed, are closed upon themselves. If the phasing grooves are spiral in shape, the phasing signal may consist simply of a plurality of cycles of an audio frequency, applied to the two master records with a phasing difference of not more than one cycle. The beginnings of the phasing signal as recorded in the two phasing grooves will then permit an initial approximate positioning of the two master records with respect to each other, after which they may be adjusted to the correct relative position in terms of a fraction of a cycle of the recorded audio frequency signal.

The indexing marks applied to the master records after their circumferential positioning by means of the phasing grooves need not of course take the form of holes produced by a drill press or otherwise. Any form of indexing mark may be employed which is readily feasible and which can be reproduced without displacement in the matrices which are formed from the master records. The indexing marks need not even be equally positioned with respect to the sound grooves on the master records to which they are applied, provided only that the angular separation between the indexing marks when applied is known.

Subject to the above-mentioned requirement of a discontinuity, the phasing grooves employed in the method of the present invention may be similar to those which are applied to the master records employed in the manufacture of the two-sided stereophonic phonograph records described and claimed in the copending application of Peter C. Goldmark, Serial No. 326,719, filed December 18, 1952, and assigned to the assignee hereof.

While the invention has been described herein in terms of a number of preferred embodiments incorporating various features of the invention, it is to be understood that the invention itself is not limited to these embodiments but is rather set forth in the appended claims. In particular, certain of the features of the invention hereinabove described can be employed separately in embodiments of the invention, or combined with others, as set forth in the appended claims.

I claim:

1. The method of manufacturing a phonograph record of flat disk shape having on its opposite faces two stereophonically related recordings adapted to be played back with reproducing styli engaging said record along a line parallel to the axis thereof which comprises cutting spiral sound grooves in two master records rotated at the same angular speed by transducers energized with trains of oscillations respectively representative of stereophonically related versions of the same sounds, stereophonically related oscillations in said trains arriving simultaneously at the styli of said transducers, cutting in said master records phasing grooves by means of transducers energized with trains of substantially sinusoidal oscillations of a common audio frequency and of known phase relation at said transducers and having a discontinuity of time separation known to a tolerance not exceeding one cycle of said frequency, no other than equal angular rotations of said master records intervening between the cutting of said spiral sound grooves and phasing grooves, reproducing the trains of sinusoidal oscillations represented by the phasing grooves, and indexing said master records in accordance with the trains of sinusoidal oscillations at points of known spacing circumferentially of said master records with respect to stereophonically related undulations in said spiral grooves.

2. The method of manufacturing a phonograph record of flat disk shape having on its opposite faces two stereophonically related recordings which comprises cutting in each of two master records rotated in opposite directions at the same angular speed spiral sound grooves respectively representative of sounds simultaneously perceived at two spaced locations with respect to the source thereof, cutting in said master records phasing grooves by means of transducers energized with trains of substantially sinusoidal oscillations of a common audio frequency and of known phase relation at said transducers and having a discontinuity of time separation known to a tolerance not exceeding one cycle of said frequency, no other than equal angular rotations of said master records intervening between the cutting of said spiral sound grooves and phasing grooves, employing said phasing grooves on playback of said master records to position said master records circumferentially with respect to playback transducers engaging said phasing grooves to generate in said playback transducers substantially sinusoidal oscillations having said phase relation and having discontinuities of said known time separation, and indexing said master records at known bearings with respect to said playback transducers.

3. The method of manufacturing a phonograph record of flat disk shape having on its opposite faces two stereophonically related recordings which comprises cutting in each of two master records rotated in opposite directions at the same angular speed spiral sound grooves respectively representative of sounds simultaneously perceived at two spaced locations with respect to the source thereof, cutting in said master records phasing grooves by means of transducers energized with trains of substantially sinusoidal oscillations of a common audio frequency and of known phase relation at said transducers and having a discontinuity of time separation known to a tolerance not exceeding one cycle of said frequency, no other than equal angular rotations of said master records intervening between the cutting of said spiral sound grooves and phasing grooves, employing said phasing grooves on playback of said master records to position said master records circumferentially with respect to playback transducers engaging said phasing grooves to generate in said playback transducers substantially sinusoidal oscillations having said phase relation and having discontinuities of said known time separation, indexing said master records at known bearings with respect to said playback transducers, forming negative matrices from said indexed master records, and positioning said matrices in a record press with the indices thereof in known angular relation.

4. The method of manufacturing a phonograph record of flat disk shape having on its opposite faces two stereophonically related recordings which comprises cutting in each of two master records rotated in opposite directions at the same angular speed spiral sound grooves respectively representative of sounds simultaneously perceived at two spaced locations with respect to the source thereof, cutting in said master records phasing grooves by means of transducers energized with trains of substantially sinusoidal oscillations of a common audio frequency and of known phase relation at said transducers and having a discontinuity of time separation known to a tolerance not exceeding one cycle of said frequency, no other than equal angular rotations of said master records intervening between the cutting of said spiral sound grooves and phasing grooves, simultaneously playing back said phasing grooves while rotating said master records at the same angular speed, adjusting said master records circumferentially with respect to the playback transducers engaging them until the signals generated in said playback transducers exhibit discontinuities substantially of said known time separation and until the sinusoidal oscillations generated in said playback transducers have the said known phase relation, establishing index marks on said master records at equal angular intervals from said playback transducers, and employing said index marks to orient to each other in known fashion in a record press negative matrices formed from said master records.

5. The method of manufacturing a phonograph record of flat disk shape having on its opposite faces two stereophonically related recordings which comprises cutting in each of two master records rotated in opposite directions at the same angular speed spiral sound grooves respectively representative of sounds simultaneously perceived at two spaced locations with respect to the source thereof, cutting in said master records phasing grooves by means of transducers energized with trains of substantially sinusoidal oscillations of a common audio frequency and of known phase relation at said transducers and having a discontinuity of time separation known to a tolerance not exceeding one cycle of said frequency, no other than equal angular rotations of said master records intervening between the cutting of said spiral sound grooves and phasing grooves, simultaneously playing back said phasing grooves while rotating said master records at the same angular speed, adjusting said master records circumferentially with respect to the playback transducers engaging them until the signals generated in said playback transducers exhibit discontinuities substantially of said known time separation and until the sinusoidal oscillations generated in said playback transducers have the said known phase relation, establishing index marks on said master records at equal angular intervals from said playback transducers, forming from said master records negative matrices having thereon index marks derived from the index marks on said master records, and positioning said matrices in a record press with the index marks thereon aligned with each other.

6. The method of manufacturing a phonograph record of flat disk shape having on its opposite faces two stereophonically related recordings which comprises cutting in each of two master records rotated in opposite directions at the same angular speed spiral sound grooves respectively representative of sounds simultaneously perceived at two spaced locations with respect to the source thereof, cutting in said master records phasing grooves by means of transducers energized with trains of substantially sinusoidal oscillations of a common audio frequency and of known phase relation at said transducers and having a discontinuity of time separation known to a tolerance not exceeding one cycle of said frequency, no other than equal angular rotations of said master records intervening between the cutting of said spiral sound grooves and phasing grooves, rotating said master records at the same angular speed while engaging said phasing grooves with playback transducers, adjusting said master records circumferentially with respect to their playback transducers until the signals generated in said playback transducers exhibit discontinuities of said known time separation and sinusoidal signals of said known phase relation, indexing said master records so adjusted at equal bearings from said playback transducers, forming negative matrices from said master records so indexed, and orienting said matrices in a record press with their indices aligned axially of the record cavity in said press.

7. The method of manufacturing a phonograph record of flat disk shape having on its opposite faces two stereophonically related recordings of the same sounds which comprises cutting in each of two master records rotated at the same angular speed spiral sound grooves by means of two transducers respectively energized with trains of oscillations respectively representative of sounds simultaneously perceived at two spaced locations with respect to the source thereof, cutting in said two master records phasing grooves by means of two transducers respectively energized with two trains of substantially sinusoidal oscillations of a common audio frequency and known phase relation at said transducers and having a discontinuity of time separation known to a tolerance not greater than one cycle of said frequency, no other than equal angular rotations of said master records intervening between the cutting of said spiral sound grooves and phasing grooves, playing back said cut master records at the same angular speed with playback transducers engaging said phasing grooves, adjusting at least one of said cut master records circumferentially with respect to its playback transducer until the signals generated in said playback transducers exhibit discontinuities substantially of said known time separation and sinusoidal oscillations of said known phase relation, marking said cut records at bearings of known angular separation from said playback transducers, forming negative matrices from said cut and marked records, and positioning said matrices in a press for the manufacture of two-sided records with the marks of said matrices at an angular displacement equal to the difference between said angular separations.

8. The method of manufacturing a phonograph record of flat disk shape having on its opposite faces two stereophonically related recordings in which stereophonically related undulations are equiangularly located about the disk axis, which method comprises simultaneously cutting in each of two master records rotated in opposite directions at the same angular speed spiral sound grooves by means of two transducers respectively energized by separate trains of oscillations, the oscillations simultaneously arriving at said transducers being respectively representative of sounds simultaneously arriving at two spaced locations with respect to the source of said sounds, cutting in said master records phasing grooves by means of said transducers energized with trains of substantially sinusoidal oscillations of a common audio frequency and of known phase relation and having a discontinuity of time separation known to a tolerance not exceeding one cycle of said frequency without other than equal angular motions of said master records with respect to said transducers between the cutting of said spiral sound grooves and phasing grooves, simultaneously playing back said phasing grooves while rotating said master records at the same angular speed, adjusting at least one of said master records circumferentially with respect to the playback transducer engaging it until the signals generated in the playback transducers engaging said master records exhibit discontinuities substantially of said known time separation and until the sinusoidal oscillations generated in said playback transducers have the said known phase relation, establishing index marks on said master records at equal angular intervals from said playback transducers, forming from said master records negative matrices having thereon index marks derived from the index marks on said master records, and positioning said matrices in a record press with the index marks thereon aligned with each other.

9. The method of manufacturing a phonograph record of flat disk shape having on its opposite faces two stereophonically related recordings of the same sounds which comprises cutting substantially congruent spiral sound groover in two master records on turntables rotated at the same angular speed by means of two electromechanical transducers respectively vibrating in accordance with sound vibrations simultaneously perceived at two spaced locations with respect to a source of sound, cutting on said master records phasing grooves by means of said transducers when energized with two trains of substantially sinusoidal electrical oscillations of a common audio frequency having a discontinuity not more than one cycle of the said frequency apart in time, said sinusoidal oscillations having at said transducers a known phase relation in time, without moving said master records with respect to said transducers otherwise than through equal angles between the cutting of said sound and phasing grooves thereon, rotating said master records at the same angular speed when supported back to back on a turntable after the cutting of said sound and phasing grooves, engaging said phasing grooves with said master records so supported by means of reproducing styli located tangentially of said master records as are located the styli of a reproducing phonograph, adjusting the relative angular position of said master records until the oscillations of said reproducing styli exhibit discontinuities not more than one cycle of said frequency apart and until the oscillations of said reproducing styli possess the same phase in time as did the sinusoidal oscillations applied to said transducers, marking said master records at locations of known angular separation with said master records so adjusted, forming from said master records negative matrices having marks thereon in the same positions relative to their respective sound grooves as the locations of the marks of said master records with respect to the sound grooves on said master records, supporting said matrices in a record press with the marks thereon at said known angular separation, and pressing a phonograph record in said press.

10. The method of manufacturing a phonograph record of flat disk shape having on its opposite faces two stereophonically related recordings of the same sounds which comprises cutting two master records on turntables rotated at the same angular speed by means of electromechanical transducers forming substantially congruent spiral sound grooves therein, said transducers being energized during the formation of said sound grooves with trains of oscillations respectively representative of the sounds from one or more sound sources as simultaneously perceived at spaced points relative to said sources, cutting on said master records phasing grooves by means of said transducers when energized with two trains of substantially sinusoidal electrical oscillations of a common audio frequency having a discontinuity not more than one cycle of the said frequency apart in time, said sinusoidal oscillations having at said transducers a known phase relation in time, without moving said master records with respect to said transducers otherwise than through equal angles between the cutting of said sound and phasing grooves thereon, rotating said master records at the said same angular speed when supported back to back on a turntable after the cutting of said sound and phasing grooves, engaging said phasing grooves with said master records so supported by means of reproducing styli located on a line parallel to the axis of rotation of said turntable, adjusting the relative angular position of said master records until the oscillations of said reproducing styli exhibit discontinuities not more than one cycle of said frequency apart and until the oscillations of said reproducing styli possess the same phase in time as did the sinusoidal oscillations applied to said transducers, marking said master records at the same circumferential positions with said master records so adjusted, forming from said master records negative matrices having marks thereon in the same positions relative to their respective sound grooves as the locations of the marks of said master records with respect to the sound grooves on said master records, supporting said matrices in a record press with the marks thereon at said known angular separation, and pressing a phonograph record in said press.

11. In the manufacture of a flat disk phonograph record having on its opposite faces stereophonically related recordings of the same sounds in congruent spiral grooves lying at the intersections of said faces with a cylindrical surface having one of said grooves as directrix and in which grooves undulations at equal distances along said grooves from starting points at the intersections of said faces with a line parallel to said faces are representative of sounds simultaneously perceived at spaced points of pickup on recording, the method which comprises the steps of mounting two blank master record disks on turntables, rotating said turntables at equal angular speeds and in opposite senses as regards the relation of said turntables to embossing heads advanced over said master records in the same radial direction for both, simultaneously embossing in said records phasing grooves of substantially the same shape and dimensions by means of styli receiving electrical signals representative of a substantially sinusoidal oscillation of a common audio frequency for both of said grooves and of known phase relation in time at said styli, said signals having a discontinuity, simultaneously embossing in said master records spiral sound grooves of the same pitch and initial radius by means of styli receiving electrical signals representative of stereophonically related versions of the same sounds without permitting other than equal rotational movements of said records with respect to said styli between the recording thereon of said phasing and sound signals, rotating said master records with their blank faces together on a turntable, engaging said phasing grooves by means of reproducing styli contacting said records at points lying on a line parallel to the axis of rotation of said turntable, adjusting said records circumferentially of each other until the time phase of the motions of said reproducing styli caused by said phasing grooves is equal to the time phase of the phasing signals applied to said cutting styli and until the discontinuities in the motions of said reproducing styli differ in time by not more than one cycle of the said frequency, marking said master records at locations of known angular separation with the master records so adjusted, forming from said master records negative matrices having marks theeron respectively in the same positions as the marks on said master records, supporting said matrices in a record press with the marks thereon at said known angular separation, and pressing positive phonograph records in said press.

References Cited in the file of this patent

UNITED STATES PATENTS

| | | |
|---|---|---|
| 447,555 | Beyer | Mar. 3, 1891 |
| 908,778 | Lamb | Jan. 5, 1909 |
| 1,190,072 | Aiken | July 4, 1916 |
| 1,787,919 | Watson | Jan. 6, 1931 |
| 1,919,585 | Degl | July 25, 1933 |
| 2,126,370 | Doolittle | Aug. 9, 1938 |